July 14, 1959     W. D. DOANE     2,894,351
HERRING HARNESS
Filed Aug. 20, 1956     2 Sheets-Sheet 1
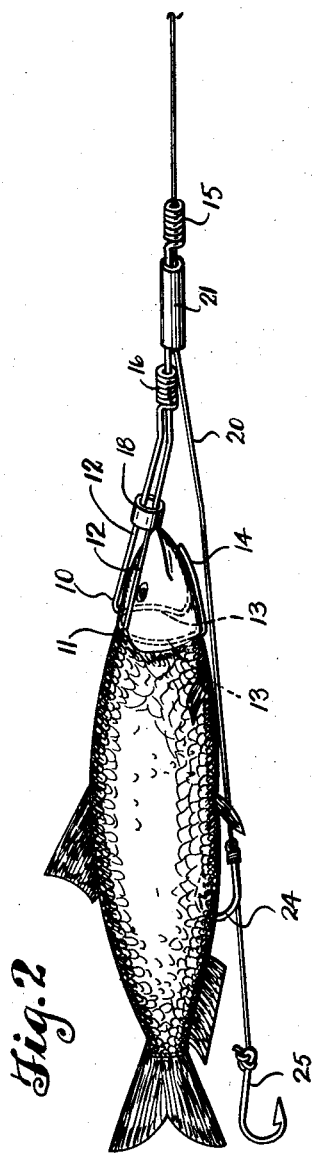
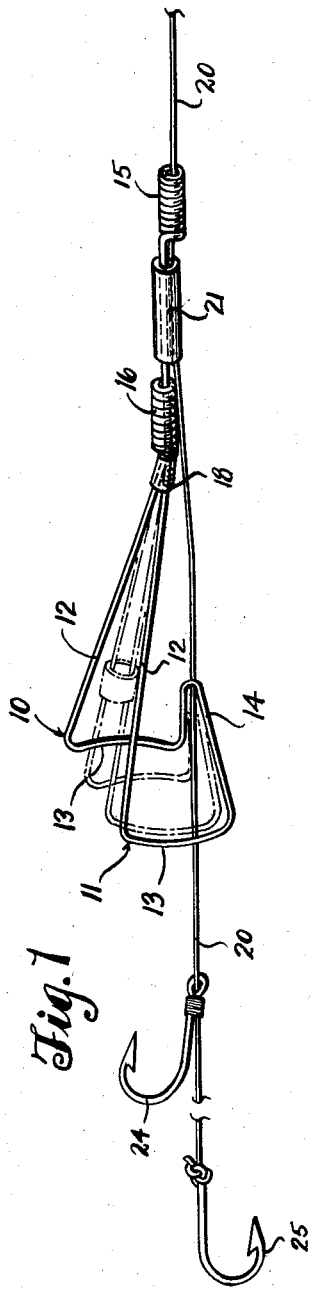
INVENTOR.
WRIGHT D. DOANE
BY
Robinson + Berry
ATTORNEYS July 14, 1959 W. D. DOANE 2,894,351
HERRING HARNESS
Filed Aug. 20, 1956 2 Sheets-Sheet 2
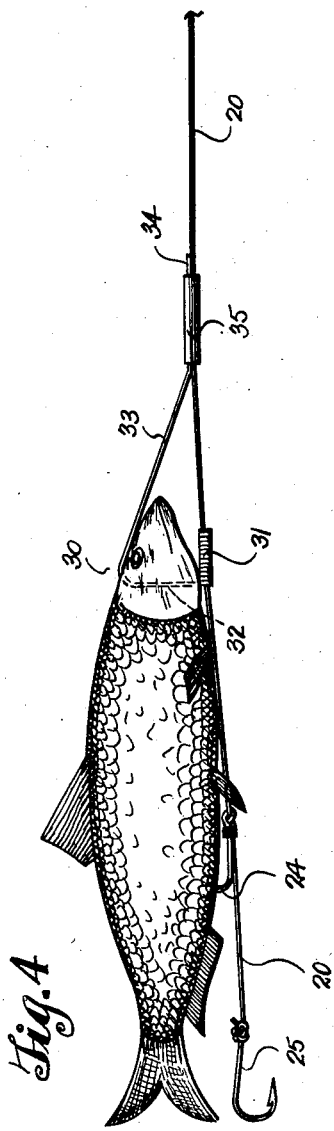
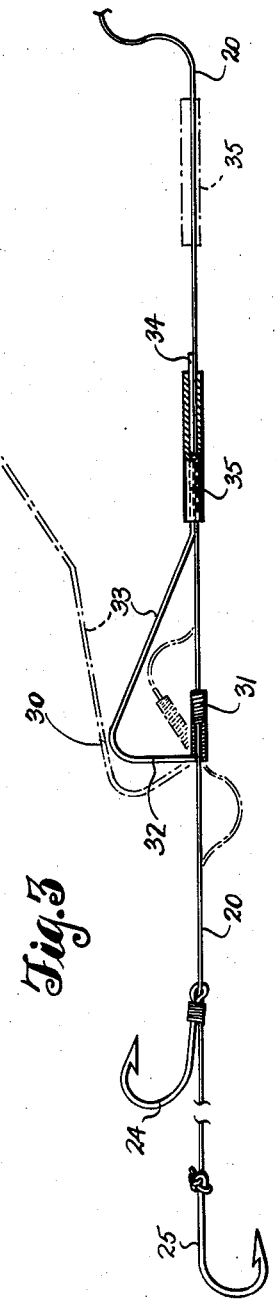
INVENTOR.
WRIGHT D. DOANE
BY
Robinson & Berry
ATTORNEYS & 2,894,351
Patented July 14, 1959

2,894,351

HERRING HARNESS

Wright Davis Doane, Port Townsend, Wash.

Application August 20, 1956, Serial No. 605,113

1 Claim. (Cl. 43—44.6)

This invention relates to devices which in the industry to which they pertain, are known as "herring harnesses" or "herring rigs," and it has reference more particularly to an improved form of herring harness for the securing of either a dead or live herring to a leader or line as bait for such fish as salmon. However, the invention is not restricted in its use to any specific bait fish or to the fishing for any particular species of fish.

It is the principal object of this invention to provide a herring harness that is easy to apply to the bait fish; which will hold the bait fish securely and satisfactory so that as drawn through the water at the end of a line, it will appear life-like and which harness is long lasting and relatively inexpensive to manufacture.

It is a further object of the present invention to provide a preferred form of herring harness that requires no threading of any part thereof through the body of the fish or any operation that is difficult to perform in cold weather at the fishing location.

Specifically stated, the present invention resides in the provision of a herring harness made from a single length of spring wire, bent in such manner as to provide two opposedly related jaw portions adapted to grip the head portion of a bait herring between them, and said jaw portions providing elements that engage the opposite sides of the head of the herring beneath the gills, and a jaw support that is disposed to hold the mouth of the bait fish closed as the bait is drawn through the water by a line with which the harness is associated.

Other objects and advantages of the invention reside in the details of construction of the harness and in its mode of application and use as will hereinafter be fully described.

In accomplishing the above mentioned and other objects of the invention, I have provided the improved details of construction, the preferred forms of which are illustrated in the accompanying drawings, wherein:

Fig. 1 is a perspective view of the present preferred form of herring harness embodied by the invention.

Fig. 2 is a perspective view showing the harness of Fig. 1 as applied to a bait fish.

Referring more in detail to the drawings.

The harness of Fig. 1 is formed, for the most part, from a single length of steel wire, preferably wire of that kind known as "piano wire," and which is bent in such manner as to provide a pair of co-acting jaw portions designated by numerals 10 and 11; each of which jaw portions comprises a rather elongated leg 12; these legs being co-extensive and being in the same plane. In reference to the showing of parts in Fig. 1, the legs 12—12 are in substantial divergence, and lying in a substantially horizontal plane. These two leg portions are provided at what is designated as their rearward ends, with downturned and cooperatively related head gripping jaws 13, and at their lower ends, these head gripping jaws 13—13 are joined by a forwardly directed and slightly upwardly curved V-shaped portion designated by reference numeral 14.

That portion of the harness forming wire which forms one of the legs 12, and which in Fig. 1 is shown at the near side of the device, extends a substantial distance forwardly of the other leg and at its forward end is formed into an open coil 15 of small diameter. The forward end of the other leg portion 12 of the harness, terminates in a small diameter coil 16. This coil is formed about the forwardly extended portion of the other leg to provide a holding connection therewith, and it is immediately rearwardly of this coil 16 that the two leg portions 12—12 start to diverge. It is to be understood that the resiliency of the spring wire from which the harness is made permits the coacting jaw portions 10 and 11 thereof to be sprung together, or toward each other from their open or diverging relationship as has been indicated by their showing in dotted lines in Fig. 1.

In order that the jaw portions 10 and 11 may be sprung toward each other, and then held in a "closed" position, I have applied a tubular plastic sleeve 18 about the leg portions 12—12. By sliding this sleeve rearwardly along the legs 12—12 as from the position in which it is shown in full lines to its dotted line position in Fig. 1, the jaw portions 13—13 will be drawn together, and will then be held in that position by the sleeve.

To apply this particular harness to a fish line or leader, the line or leader, herein designated by numeral 20, is threaded rearwardly through the open coil 15 as formed on the forward end of the extended leg 12 of the harness. From this coil it is threaded through a plastic sleeve 21 that is applied about the forwardly extended portion of leg 12 between the coils 15 and 16. This sleeve is close fitting and will operate to hold the line against easy slippage, and will retain a normal relationship of line for trolling operations. From the sleeve 21 the line 20 continues rearwardly passing below the part 14 of the harness. Rearwardly of part 14 a hook 24 is attached to the line for application to the belly of the bait fish, as illustrated in Fig. 2, and at the end of the line, a few inches rearwardly of hook 24, a fish hook 25 is attached. This latter hook might have a single, double or treble barb, according to desires of the fisherman. The normal position of this harness, as associated with a line or leader 20 equipped with hooks 24 and 25 is as shown in Fig. 1. The normal mode of application of the harness to a bait fish is as shown in Fig. 2.

Assuming that the harness is formed as shown in Fig. 1, and it is desired to apply it to a bait fish, the procedure is as follows: By holding the bait fish in one hand, and the harness in the other, the head of the fish is applied between the open jaw portions 10 and 11, and the legs 13—13 are brought to a position immediately back of the gills of the fish. Then the jaw portions are pressed together and the harness drawn forwardly relative to the fish to locate the legs 13—13 within the gill openings of the head of the fish as shown in Fig. 2. Then the sleeve 18 is slipped rearwardly on the legs 12—12 to hold the jaw portions in the head clamping position. The hook 24 is then applied to the belly of the fish, the line 20 pulled forwardly through the sleeve 21 to eliminate slack, and the line is baited and ready for use.

It is to be understood that with the harness so applied to the bait fish, the part 14 thereof serves to support the lower jaw of the bait fish and hold its mouth closed so that the action of the bait in the water will simulate that of a live or crippled herring.

It is further to be explained that the size of the wire, employed in making the harness, the dimensions of various parts and their proportionate sizes might be altered to meet requirements or desires of different fishermen. In the present showing, the coils 15 and 16 are somewhat larger in proportion to wire diameter than in actual use, but have been so illustrated for better showing and understanding. Also it is preferred that the parts 13—13 be somewhat outwardly curved to conform to the shape of the head to which they are applied.

To remove the harness from a bait fish, it is only necessary that the sleeve 18 be slipped forwardly to the joining point of legs 12—12, thus to allow the jaw portions 10, 11 to automatically spring apart and release the head of the bait fish. The hook 24 may be removed from the bait fish either before or after the jaws 10—11 are released.

I claim:

A herring harness of the character described adapted to be removably applied to a fish line, said harness being formed from a continuous strip of spring wire, a spiral coil formed at one end of the wire for freely passing the fish line therethrough, a substantially horizontal straight portion adjacent said coil, a pair of diverging jaw forming elements adjacent to and extending beyond said straight portion, the other end of said wire being formed into a spiral coil about said straight portion, a friction sleeve about the straight portion and fish line to retain the harness in releasably fixed position on the fish line, said jaws each comprising an angularly inclined leg portion and a head engaging portion extending downwardly from the outer ends of the legs at a substantial angle thereto, a forwardly directed, V-shaped portion connecting the lower ends of said head engaging portions, a slip sleeve applied about both of said legs and said sleeve being movable along said legs to draw them together so as to cause the head engaging portions to grip the opposite side of the head of a bait fish placed therebetween.

References Cited in the file of this patent

UNITED STATES PATENTS

| | | |
|---|---|---|
| 86,609 | Terrell | Feb. 2, 1869 |
| 797,161 | West | Aug. 15, 1905 |
| 1,386,061 | Johnson | Aug. 2, 1921 |
| 1,388,386 | Svenson | Aug. 23, 1921 |
| 1,461,246 | Lent | July 10, 1923 |
| 2,000,954 | Hopkins | May 14, 1935 |
| 2,164,708 | Hadaway | July 4, 1939 |
| 2,821,046 | Fisk | Jan. 28, 1958 |

FOREIGN PATENTS

| | | |
|---|---|---|
| 170,510 | Austria | Feb. 25, 1952 |